United States Patent [19]
Huber

[11] Patent Number: 5,722,241
[45] Date of Patent: Mar. 3, 1998

[54] INTEGRALLY INTERCOOLED AXIAL COMPRESSOR AND ITS APPLICATION TO POWER PLANTS

[75] Inventor: David John Huber, North Canton, Ohio

[73] Assignee: Westinghouse Electric Corporation, Pittsburgh, Pa.

[21] Appl. No.: 606,629

[22] Filed: Feb. 26, 1996

[51] Int. Cl.[6] ............................................. F02C 7/143
[52] U.S. Cl. ................... 60/728; 60/39.75; 415/114; 415/179
[58] Field of Search ................. 60/39.05, 39.511, 60/39.53, 39.55, 39.75, 728; 415/114, 179

[56] References Cited

U.S. PATENT DOCUMENTS

| | | |
|---|---|---|
| 1,088,585 | 2/1914 | Junkers .................................. 415/179 |
| 2,396,484 | 12/1946 | Allen et al. . |
| 2,868,500 | 1/1959 | Boulet .................................... 60/39.75 |
| 3,987,631 | 10/1976 | Heller et al. ........................... 60/39.5 |
| 4,653,268 | 3/1987 | Nakamura ............................. 60/39.53 |

FOREIGN PATENT DOCUMENTS

| | | |
|---|---|---|
| 252 876 | 10/1948 | Switzerland . |
| 337 974 | 6/1959 | Switzerland . |
| 1 516 041 | 6/1978 | United Kingdom . |
| 2 090 631 | 7/1982 | United Kingdom . |
| 2 291 130 | 1/1996 | United Kingdom . |

Primary Examiner—Louis J. Casaregola

[57] ABSTRACT

An integrally intercooled axial compressor where the axial compressor passes cooling water through one or more stator assemblies and/or an internal air-to-water heat exchanger located in the gas flow path of the compressor to reduce the temperature of the gas as it is compressor in different stages of the axial compressed.

14 Claims, 3 Drawing Sheets

INTEGRALLY INTERCOOLED AXIAL COMPRESSOR AND ITS APPLICATION TO POWER PLANTS

FIELD OF THE INVENTION

The present invention relates to an axial compressor which includes intercooling within the casing of the compressor and its use in gas turbine systems.

BACKGROUND OF THE INVENTION

FIG. 1, prior art, is a diagram of an axial compressor 10. The compressor 10 includes air or gas inlets 40, inlet gas vanes ("IGV") 42, a rotor 50 connected to a shaft 20, stators 60, and a casing 12. In operation, rotational torque is provided to the shaft 20, causing the rotor 50 to rotate about a fixed longitudinal axis of the shaft 20. Atmospheric air or gas 30 is drawn into the inlets 40, and passes the inlet gas vanes 42 to the first row of rotor blades where the gas is compressed between the rotor blades 50 and first sets of stator vanes 60. As the shaft 20 continues to rotate, the gas is passed to subsequent sets of rotor blades and stator vanes and compressed further. Due to the relationship between pressure, temperature, and volume for a gas, the gas is heated during each compression stage of the compressor 10.

If the temperature of the gas is not reduced during the compression process, the high temperature gas may interfere with the reliable action of the compressor 10 and introduce lubrication difficulties, in addition to increasing the required work to compress to a given pressure and reducing the efficiency of the compressor 10. As a consequence, cooling mechanisms for axial compressors have been developed to reduce the temperature of the gas during the compression process. Prior art cooling mechanisms for axial compressors 10 include external fins or water-jackets about the outside casing 12 of axial compressor 10. External fins and a water-jacket help dissipate heat from the gas by reducing the temperature of the casing 12 of the axial compressor 10. The temperature of the gas still increases, however, during the compression stages reducing the efficiency of the compressor 10 and turbine systems employing the compressor. To overcome this inefficiency, combined cycle power plants have been developed which include a bottoming steam cycle.

A turbine system employing an efficient compressor, such as an intercooled compressor, however, would not require a bottoming steam cycle. In particular, a gas turbine power plant utilizing an intercooled compressor and exhaust gas heat recuperation could have an efficiency similar to a system employing a bottoming steam cycle. It is well understood that increasing the amount of intercooling of a compressor in a power plant increases both the thermal efficiency and output of the power plant. Thus, ideally the compressor of a gas turbine system should be continuously intercooled. An intercooled and recuperated gas turbine system would have a thermal efficiency and output similar to that of a gas turbine/steam turbine combined cycle power plant employing the same gas turbine.

As noted above, conventional techniques for cooling an axial compressor employ external cooling mechanisms. As a consequence, continuously intercooling an axial compressor using conventional techniques would require: 1) centrifugal diffusion of the gas after compression stages; 2) passing the gas through an air-to-water heat exchanger located externally to the compressor; and 3) reintroducing the gas into the compressor flowpath via an inlet volute. Such an intercooling system would be large, complex, and costly. Thus, a need exists for an axial compressor having an internal mechanism for continuously intercooling the gas being compressed by axial compressor.

SUMMARY OF THE INVENTION

The present invention provides cooling means to intercool axial compressors within the axial flowpath without removing the compressor gas from the compressor casing. The cooling means is located in a flow path of gas passing through the compressor when in operation. The cooling means receives cooling water and absorbs heat from gas passing the cooling means when the compressor is in operation, thereby cooling the gas.

The cooling means may include a water cooled stator assembly located in a flow path of gas passing through the compressor when in operation. The stator assembly receives cooling water and absorbs heat from gas passing over the stator assembly when the compressor is in operation. The cooling means may further include a second water cooled stator assembly located in the flow path of gas passing through the compressor when in operation. The second stator assembly receives cooling water and absorbs heat from gas passing over the second stator assembly when the compressor is in operation.

The cooling means may also include an integral air to water heat exchanger located in the compressor and in the flow path of gas passing through the compressor when in operation. The heat exchanger also receives cooling water and absorbs heat from gas passing through the heat exchanger when the compressor is in operation. In addition, an axial diffuser may be located upstream of the heat exchanger to reduce pressure loss.

DETAILED DESCRIPTION OF THE PREFERRED EMBODIMENTS

Figure 1:
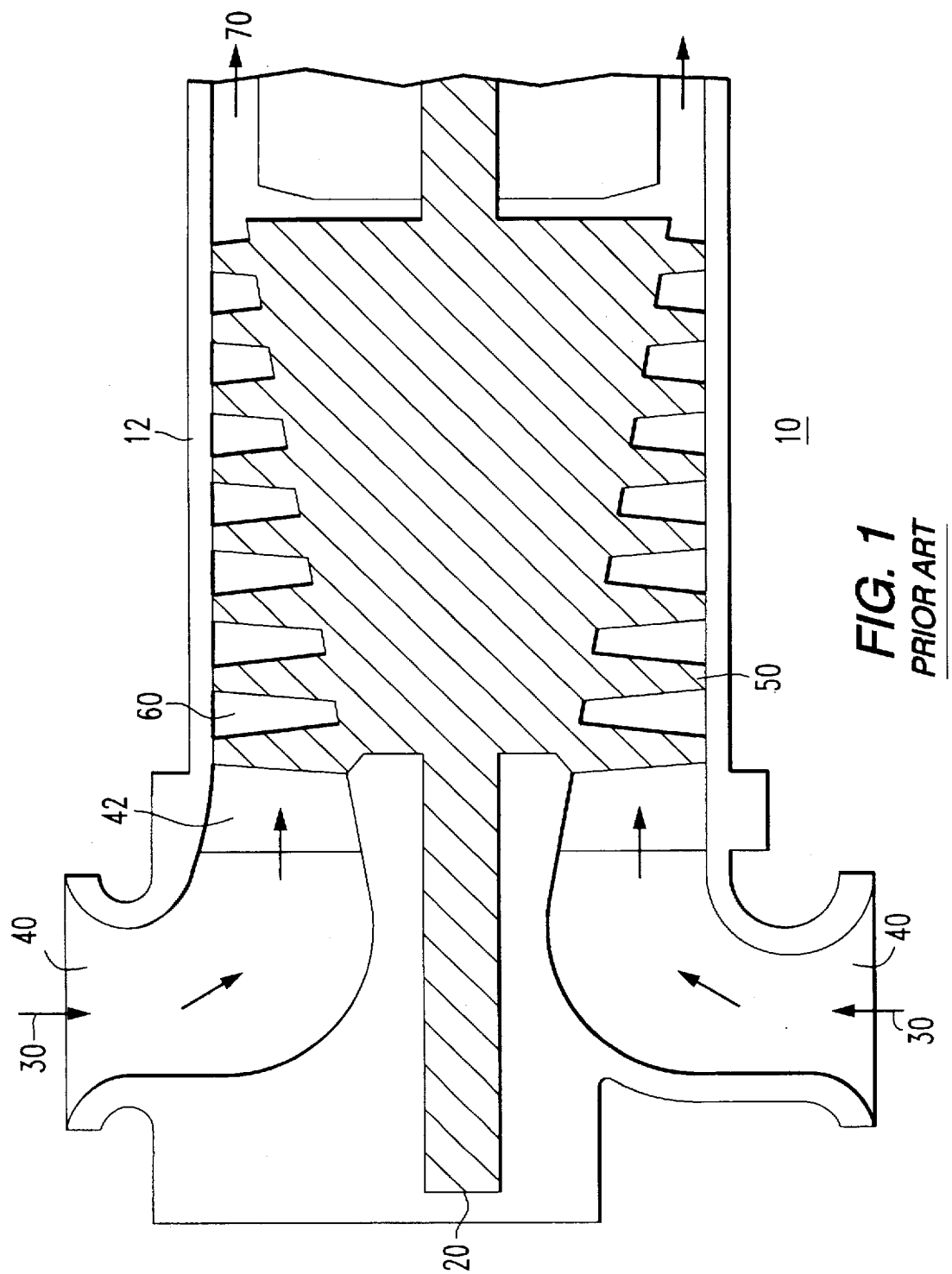
FIG. 1 (Prior Art) is a cross sectional diagram of an axial compressor.
Figure 2A:
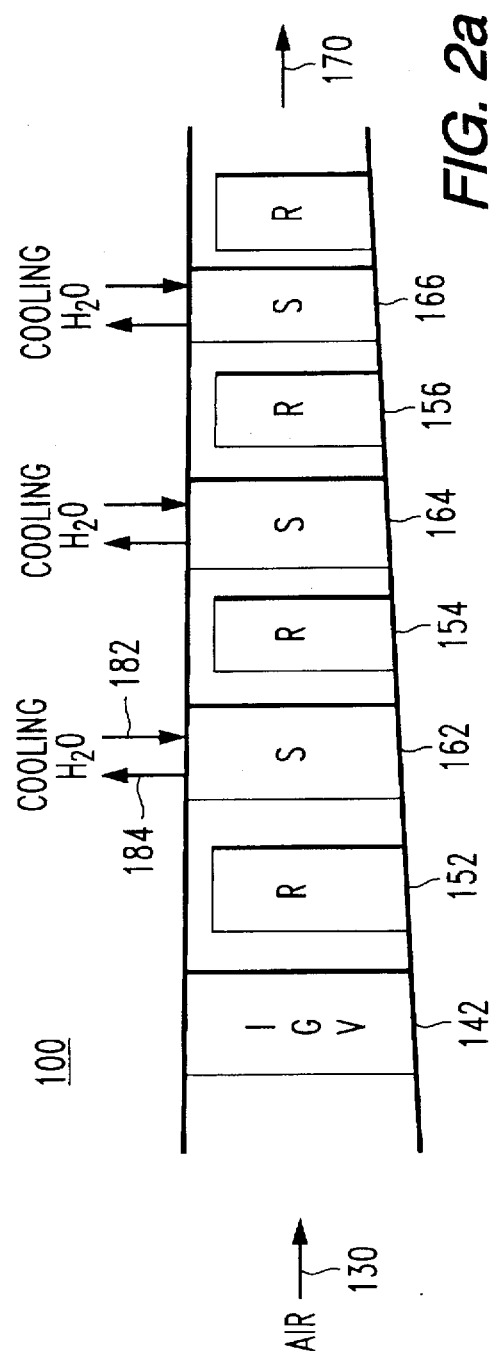
FIG. 2a is segment of a cross section of one preferred embodiment of a continuously intercooled axial compressor of the present invention.

FIG. 2a is a segment of an axial compressor 100 according to the present invention. The segment of the axial compressor 100 includes an inlet guide vane 142, a first, a second, and a third set of rotor blades 152, 154, and 156, and a first, a second, and a third set of water cooled stator assemblies 162, 164, and 166. Atmospheric air or gas 130 is passed through the inlet guide vanes 142 and compressed by the first set of rotor blades 152 and stator assembly 162 to generate compressed gas 170. During the compression of the gas, the temperature of the gas is increased. In order to limit or reduce the increase in temperature of the gas during this first compression stage, cooling water ($H_2O$) 182 is circulated through the first stator assembly 162. The cooling water 182 absorbs heat from the gas passing over the stator assembly by a convection process and, thus, is heated. The heated, cooling water 184 is passed out of the stator assembly 162 and may be cooled and recycled as cooling water 182.

This process and stator configuration, thus, reduces the temperature of the compressed gas generated by the first stage of the axial compressor 100 as it passes stator 162. The second and third stages of the axial compressor also include water cooled stator assemblies 164 and 166. As a consequence, the temperature of the compressed gas produced after the third stage of compression in the axial compressor 100 is lower than compressed gas generated after the same third stage by traditional or prior art compressors. This is due to absorption of heat by the cooling water present in the stator assemblies. As the heated, compressed gas passes by a stator assembly 162, 164, or 166, the cooling water absorbs heat from the compressed gas by convection. As a consequence, the temperature of the compressed gas is reduced. This compressor configuration represents a high Mach number, low pressure loss approach. In addition, the axial compressor 100 may also be externally cooled by fins or a water-jacket (not shown) as in prior art compressors.

Because the water cooled stator assemblies 162, 164, and 166 of the axial compressor 100 lower the temperature of the gas produced by a compressor 100, these stator assemblies help increase the efficiency of the compressor and, thus, any turbine system or power plant employing the axial compressor with the stator assemblies 162, 164, and 166. In detail, the embodiment (shown in FIG. 2a), which performs intercooling by pumping water through the stator assemblies 162, 164, and 166, enables a reduction in the size and number of compressor stages required to compress a given gas flow to a given pressure over prior art compressors. This is due to the reduced temperature of the compressed gas because of the intercooling provided by each stator assembly. Thus, the corrected flow (flowpath cross-sectional area) is reduced and the corrected speed (stage pressure ratio) is increased which enables a reduction in the size and length of the entire compressor.

Figure 2B:
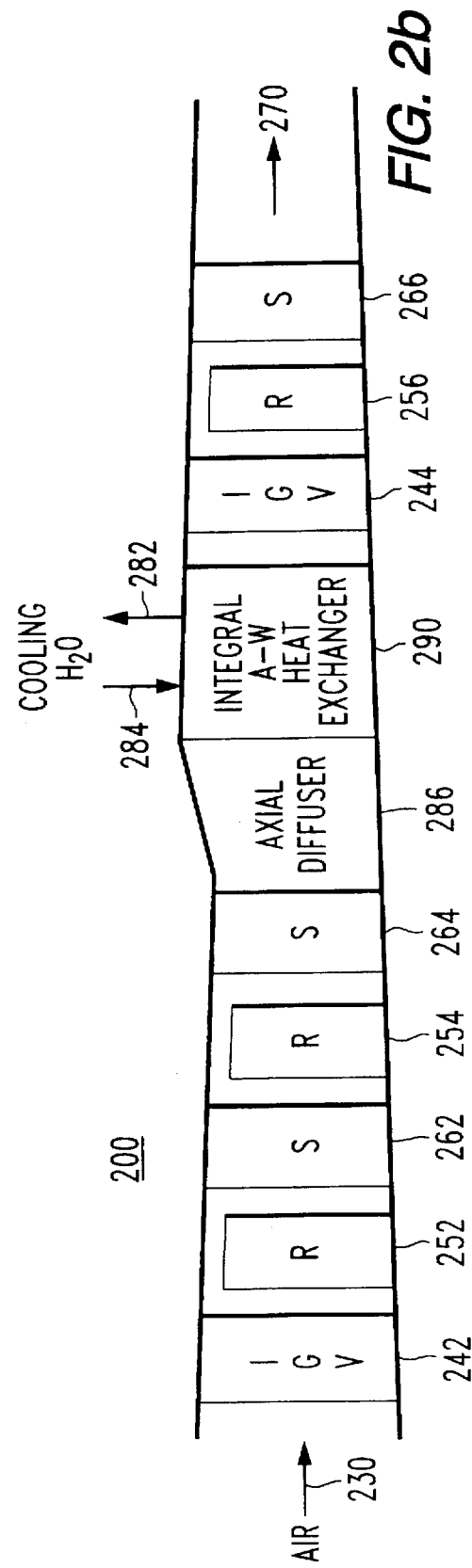
FIG. 2b is segment of a cross section of another preferred embodiment of a continuously intercooled axial compressor of the present invention.

FIG. 2b is a segment of another preferred embodiment of an intercooled axial compressor 200. The axial compressor 200 includes first inlet guide vanes 242 and second inlet guide vanes 244, three sets of rotor blades, 252, 254, and 256, three sets of stator assemblies 262, 264, and 266, an axial diffuser 286, and an integral air to water heat exchanger 290. In the axial compressor 200, atmospheric air or gas 230 is first passed by inlet guide vanes 242 and compressed through several axial compressor stages, in detail, rotor blades and stator assemblies 252 and 262 and 254 and 264. Then, the compressed, heated gas is diffused in an axial diffuser 286 and passed through an integral air-to-water heat exchanger 290 to cool the heated, compressed gas prior to its ingestion into the next compressor stage group, in detail, past inlet guide vanes 244, rotor blade 256 and stator assembly 266. There may also be additional intercooling after the third stage of compression. Although the Figure shows only three stages for illustrative purposes, it is to be understood that the number of compressor stages may be lesser or greater.

In axial compressor 200, the air-to-water heat exchanger 290 is located within the axial flowpath of the compressor, between the second and third stage of axial compression. The air-to-water heat exchanger 290 receives cooling water 282 and generates heated, cooling water 284 by extracting heat from the heated, compressed gas. In addition to the air-to-water heat exchanger, an axial compressor may also include one or more water cooled stator assemblies such as those shown in FIG. 2a (162, 164, and 166). The axial compressor 200 represents a low Mach number, increased pressure loss approach to axial intercooling of heated, compressor gas. In this embodiment, the degree of diffusion can be varied to minimize the sum of total pressure losses across the diffuser 286 and the heat exchanger 290. In addition, the diffuser 286 may be eliminated if the associated pressure loss is not significantly more than a compressor with both a diffuser 286 and heat exchanger together 290. In such an axial compressor, the intercooler system can be much more compact.

The intercooling system of the axial compressor 200 also increases the efficiency of the system as compared to a prior art axial compressor. This may enable a reduction in the number of compressor stages. In this embodiment, however, these benefits may be offset by the increased compressor length needed to house the diffuser 286 (if necessary) and integral heat exchanger 290, as well as their associated additional pressure losses.

Either of the two intercooling embodiments described above and shown in FIGS. 2a and 2b may be utilized between any number of compressor stages. For example, the compressor may be intercooled only once, or several times through the compression process, or after every compression stage upstream of additional compression stage(s). Additionally, a combination of the above two techniques, or a hybrid technique using characteristics of both concepts or embodiments, may be employed. Both techniques or embodiments pose minimal technical concerns and do not require the use of demineralized water. Additionally, pressure relief valves (not shown) may be located at each intercooler location to minimize the possibility of compressor surge due to intercooler failure.

Figure 3:
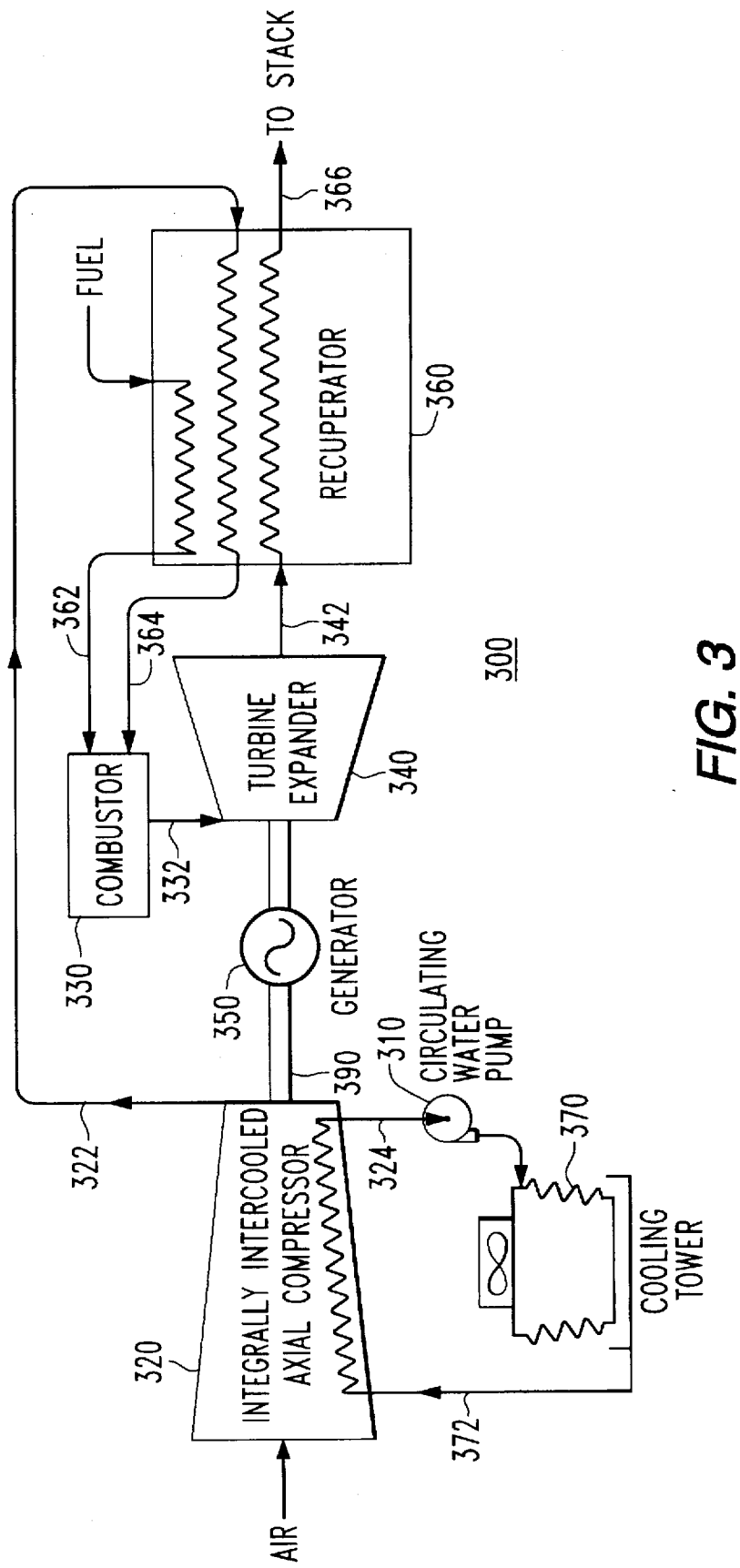
FIG. 3 is a diagram of a preferred embodiment of a gas turbine system employing a continuously intercooled axial compressor of the present invention.

FIG. 3 is a diagram of a recuperated gas turbine power plant 300 employing an integrally intercooled axial compressor 320 of the present invention. The plant 300 includes a shaft 390 linking the axial compressor 320 to a power generator 350 and turbine 340, combustor 330, recuperator 360, cooling tower, and circulating water pump 310. In basic operation, the axial compressor 320 receives atmospheric air or gas and generates compressed gas 322. During the compression process, the gas is cooled internally in the axial compressor 320 by cooling water 372 received from the cooling tower. The cooling water 372 may be passed through one or more stator assemblies or an air-to-water heat exchanger located within the gas flow path of the axial compressor 320.

The recuperator 360 receives exhaust gas from the turbine expander 340, fuel, and the compressed gas 322. The recuperator 360 extracts heat from the turbine exhaust gas 342 and applies the extracted heat to the fuel and compressed gas to generate heated fuel 362 and heated, compressed gas 364. After heat is extracted from the turbine exhaust gas 342, the cooled, exhaust gas 366 is passed to a stack for disposal from the plant 300. The combustor 330 receives the heated fuel 362 and heated, compressed gas 364 generated by the recuperator 360. The combustor 330 burns the heated fuel 362 to generated heat and applies the heat to the heated, compressed gas to generated super-heated, compressed gas 332.

The turbine expander 340 receives the super-heated, compressed gas 332 generated by the combustor 330. The turbine 340 generates mechanical torque on the shaft 390 by expanding the super-heated, compressed gas 332. The expanded gas is passed to the recuperator 360 as turbine exhaust gas 342. The mechanical torque on the shaft 390 operates the generator 350 and the compressor 320 which are attached to the shaft 390. The generator 350 converts the mechanical energy of the torque on the shaft 390 into electrical energy and the compressor 320 uses the energy to compress atmospheric gas. Because the axial compressor is intercooled, the compressor 320 will require less energy to compress the atmospheric air to the compression level required by the turbine expander 340 of the power plant 300. As a consequence, more energy can be applied to the generator 350 to generate a greater amount of electrical power, i.e., to increase the energy efficiency of the power plant.

This power plant 300, thus, has a thermal efficiency and output similar to that of combined cycle gas turbine steam power plants which employ the same gas turbine components (except the compressor 320, which is only similar in blade-path technology). Due to the simplicity of this intercooled and recuperated power plant, however, its cost is much less than that of a combined cycle power plant. In particular, the plant shown in FIG. 3 eliminates the need for a heat recovery steam generator, steam drums and lines, steam turbines, condenser, and many plant controls, while adding only the integrally intercooled axial compressor and the recuperator. The cooling tower and circulating water system is retained for cooling water supply to the compressor intercooler(s), but the size and water consumption of the cooling water system in the plant 300 shown in FIG. 3 is reduced by approximately 25% as compared to a conventional combined cycle power plant.

Although the invention has been described in terms of an exemplary embodiment, the spirit and scope of the appended claims are unlimited by any details not expressly stated in the claims. For example, the power plant 300 shown in FIG. 3 has many possible plant equipment layouts, in particular, it is the optimal thermodynamic cycle for integration into a solid oxide fuel cell combined cycle.

What is claimed is:

1. A power plant comprising an integrally intercooled axial flow compressor, the compressor comprising:
 a plurality of rotor blades and stator vanes; and
 cooling means comprising a water-cooled stator assembly located in a flow path where gas passes through the compressor when in operation for receiving cooling water and for absorbing heat from gas passing over the cooling means, whereby, when the compressor is in operation the gas is cooled;
 the cooling means further comprising an integral air to water heat exchanger located in the compressor downstream of the rotor blades and the stator vanes and in the flow path, the heat exchanger receiving cooling water and absorbing heat from the gas passing through the heat exchanger when the compressor is in operation; and
 an axial diffuser located upstream of the heat exchanger.

2. A power plant according to claim 1, the compressor further comprising a set of rotor blades and the cooling means further comprising a second water cooled stator assembly disposed in the flow path, the set of rotor blades located between the first water cooled stator assembly and the second water cooled stator assembly, the second stator assembly receiving cooling water and absorbing heat from the gas passing over the second stator assembly when the compressor is in operation.

3. A power plant according to claim 2, the compressor further comprising a second set of rotor blades and the cooling means further comprising a third water cooled stator assembly disposed in the flow path, the second set of rotor blades located between the second water cooled stator assembly and the third water cooled stator assembly, the third stator assembly receiving cooling water and absorbing heat from the gas passing over the third stator assembly when the compressor is in operation.

4. A power plant according to claim 1, the water cooled stator assembly coupled downstream to a first set of said rotor blades, receiving cooling water, and absorbing heat from the gas passing over the stator assembly when the compressor is in operation.

5. A power plant according to claim 4, the compressor further comprising inlet guide vanes located upstream of the plural sets of rotor blades.

6. A power plant according to claim 1, the cooling means further comprising inlet guide vanes located upstream of the heat exchanger.

7. A power plant comprising an integrally intercooled axial flow compressor, the compressor comprising:
 a plurality of rotor blades and a plurality of stator vanes;
 a first water cooled stator assembly located in a flow path where gas passes through the compressor when in operation, the stator assembly receiving cooling water and absorbing heat from gas passing over the stator assembly when the compressor is in operation;
 an integral air to water heat exchanger located downstream of the rotor blades and stator vanes in the flow path, the heat exchanger receiving cooling water and absorbing heat from the gas passing through the heat exchanger when the compressor is in operation; and
 an axial diffuser located upstream of the heat exchanger.

8. A power plant according to claim 7, the compressor further comprising:
 a first set of rotor blades; and
 a second water cooled stator assembly disposed in the flow path, the first set of said rotor blades located between the first water cooled stator assembly and the second water cooled stator assembly, the second stator assembly receiving cooling water and absorbing heat from the gas passing over the second stator assembly when the compressor is in operation.

9. A power plant according to claim 8, the compressor further comprising inlet guide vanes located upstream of the heat exchanger.

10. A power plant according to claim 9, the compressor further comprising:
 a second set of said rotor blades; and
 a third water cooled stator assembly disposed in the flow path, the second set of said rotor blades located between the second water cooled stator assembly and the third water cooled stator assembly, the third stator assembly receiving cooling water and absorbing heat from the gas passing over the third stator assembly when the compressor is in operation.

11. A gas turbine system, comprising:
 an integrally intercooled axial flow compressor generating compressed gas, the compressor comprising:
 a plurality of rotor blades and a plurality of stator vanes;
 a first water cooled stator assembly located in a flow path where gas passes through the compressor when in operation, the stator assembly receiving cooling water and absorbing heat from gas passing over the stator assembly when the compressor is in operation;
 an integral air to water heat exchanger located downstream of the rotor blades and stator vanes in the flow path, the heat exchanger receiving cooling water and absorbing heat from the gas passing through the heat exchanger when the compressor is in operation; and an axial diffuser located upstream of the heat exchanger;

a combustor, the combustor combusting fuel to generate heat energy and applying the heat energy to the compressed gas to generate super-heated, compressed gas;

a turbine expander, the turbine expanding the super-heated, compressed gas to generate mechanical energy on a shaft; and a generator connected to the shaft, the generator converting the mechanical energy of the shaft into electrical energy.

12. A gas turbine system according to claim 11, further comprising:

a cooling tower; and a circulating water pump, the pump directing heated cooling water from the compressor to the cooling tower where the water is cooled and then directed to the compressor as cooling water.

13. A gas turbine system according to claim 11, further comprising:

a recuperator, the recuperator receiving exhaust gas from the turbine expander, extracting heat energy from the exhaust gas, and applying the heat energy to the compressed gas and fuel provided to the combustor.

14. A gas turbine system, comprising:

an integrally intercooled axial flow compressor for generating compressed gas, the compressor comprising:

a water cooled stator assembly located in a flow path where gas passes through the compressor when in operation, the stator assembly receiving cooling water and absorbing heat from gas passing over the stator assembly when the compressor is in operation;

an integral air to water heat exchanger located in the flow path, the heat exchanger receiving cooling water and absorbing heat from the gas passing through the heat exchanger when the compressor is in operation;

a set of rotor blades;

a second water cooled stator assembly disposed in the flow path, the set of rotor blades located between the stator assembly and the second water cooled stator assembly, the second stator assembly receiving cooling water and absorbing heat from the gas passing over the second stator assembly when the compressor is in operation;

an axial diffuser located upstream of the heat exchanger;

inlet guide vanes located upstream of the heat exchanger;

a second set of rotor blades; and, a third water cooled stator assembly disposed in the flow path, the second set of rotor blades located between the second water cooled stator assembly and the third water cooled stator assembly, the third stator assembly receiving cooling water and absorbing heat from the gas passing over the third stator assembly when the compressor is in operation;

a combustor, the combustor combusting fuel to generate heat energy and applying the heat energy to the compressed gas to generate super-heated, compressed gas;

a turbine expander, the turbine expanding the super-heated, compressed gas to generate mechanical energy on a shaft;

a generator connected to the shaft, the generator converting the mechanical energy of the shaft into electrical energy;

a cooling tower;

a circulating water pump, the pump directing heated cooling water from the compressor to the cooling tower where the water is cooled and then directed to the compressor as the cooling water; and a recuperator, the recuperator receiving exhaust gas from the turbine expander, extracting heat energy from the exhaust gas, and applying the heat energy to the compressed gas and fuel provided to the combustor.

* * * * *